United States Patent [19]
Bracken

[11] 3,876,773

[45] Apr. 8, 1975

[54] GAS MIXTURES CONTAINING NITROUS OXIDE

[75] Inventor: Arthur Bracken, Surrey, England

[73] Assignee: The British Oxygen Company Limited, London, England

[22] Filed: May 15, 1973

[21] Appl. No.: 360,428

[52] U.S. Cl.................................. 424/161; 424/350
[51] Int. Cl............................................. A61l 27/00
[58] Field of Search............................ 424/161, 350

[56] References Cited
UNITED STATES PATENTS

| | | | |
|---|---|---|---|
| 2,996,427 | 8/1961 | Robson | 424/350 |
| 3,104,202 | 9/1963 | Larsen | 424/161 |
| 3,192,106 | 6/1965 | Bracken et al. | 424/350 |

*Primary Examiner*—Jerome D. Goldberg
*Attorney, Agent, or Firm*—Dennison, Dennison, Townshend & Meserole

[57] ABSTRACT

An anaesthetic gas mixture including nitrous oxide, oxygen and a small proportion of carbon dioxide.

4 Claims, No Drawings

GAS MIXTURES CONTAINING NITROUS OXIDE

FIELD OF THE INVENTION

This invention relates to gas mixtures containing nitrous oxides.

PRIOR ART

Mixtures of approximately equal amounts of nitrous oxide and oxygen have good analgesic properties and have been widely used to relieve pain arising in childbirth and from road accident injuries. Our U.S. Pat. No. 3,192,106 relates to pressurised containers of such mixtures. The containers claimed therein provide a convenient source of an analgesic mixture requiring little skill in administration. The periods of time required for inducing the analgesic effect and for recovery from it are however relatively slow.

Effort has therefore been directed to finding a quick-acting easy-to-administer anaesthetic gas. For road accident cases in particular rapid removal of the injured person from a vehicle is often vital but may be seriously delayed if the person has severe pains from his injuries. A simple quick-acting powerful analgesic is highly desirable in such a situation.

SUMMARY OF THE INVENTION

The invention relates to new gas mixtures containing nitrous oxide that provide the desired improvements over the mixtures previously proposed.

According to the invention there is provided a gas mixture containing 40 to 60% of nitrous oxide, 3 to 10% of carbon dioxide and 30 to 55% oxygen, the proportion of oxygen being at least 5 times that of carbon dioxide.

The preferred gas mixture contains 45 to 55% nitrous oxide, 5 to 7% of carbon dioxide and 40 to 50% of oxygen. The optimum appears to be 50% nitrous oxide, 46% oxygen and 4% carbon dioxide.

The gas mixture can include one or more anaesthetic gases in addition to the nitrous oxide and carbon dioxide. For example the inclusion of halothane in an amount below 1% has been found beneficial.

Carbon dioxide was used as an anaesthetic as early as 1820 but is has generally been avoided because of a tendency to cause cardiac irregularities. We have now found that it can be included in small amounts in a nitrous oxide/oxygen mixture provided that a high proportion of oxygen is also present. It appears that cardiac problems with carbon dioxide in small proportions arose hitherto because of simultaneous deprivation of oxygen. Nevertheless, even in the presence of adequate oxygen, the risk of cardiac problems makes it necessary to avoid carbon dioxide proportions above 10%.

Like nitrous oxide at levels of below 50%, carbon dioxide at levels below 10% has an analgesic effect but does not generally induce unconsciousness. A mixture of nitrous oxide and carbon dioxide in the proportions claimed considerably increases the analgesic effect and indeed in many patients does induce unconsciousness. The mixture stimulates respiration and increases the flow of blood to the brain, thus providing both rapid induction of analgesia or anaesthesia and subsequent rapid recovery.

If halothane is included in the mixture full anaesthesia is attained but we have found the required quantity of halothane in mixtures according to the invention to be less than in nitrous oxide/oxygen/halothane mixtures. Again induction of anaesthesia and recovery from it are rapid since the stimulated respiration sweeps the halothane into and out of the lungs more rapidly.

Containers, such as pressure cylinders, holding the mixture of the invention under pressure are included within the scope of the invention. The pressure is preferably at least 50 bars.

In filling the container it is found best to adopt the following order.

1. inject carbon dioxide into the container under pressure until the pressure in the container is at the level of the desired amount of carbon dioxide, but maintaining the pressure below that at which the carbon dioxide would liquefy, 2. introduce a measured weight of liquid nitrous oxide into the container, 3. introduce oxygen into the container at such a point that it must pass through the liquid nitrous oxide and continue the introduction until the pressure in the container indicates the desired amount of oxygen to be present.

In filling a conventional cylinder it is found most convenient to conduct the steps (1) and (2) with the cylinder vertically upright, the opening being at the top, and then to invert the container and introduce the oxygen through the opening now located at the base.

Other methods of filling that can be used but have not been found as good as the above order are as follows:

i. form a mixture, measured by weight, of the desired proportions of nitrous oxide and liquid carbon dioxide under pressure, ii. with the mixture in an inverted cylinder, introduce oxygen until the pressure indicates the presence of the desired amount of oxygen, i. form a mixture, measured by pressure, of the desired proportions of carbon dioxide liquid and oxygen by passing oxygen into an inverted container holding the carbon dioxide, ii. add the desired weight of nitrous oxide to a cylinder, invert the cylinder and introduce the gas mixture formed by step (i) until the pressure indicates the presence of the desired amount of the mixture.

We claim:

1. An anaesthetic gas mixture containing 40 to 60% of nitrous oxide, 3 to 10% of carbon dioxide and 30 to 55% oxygen, the proportion of oxygen being at least 5 times that of carbon dioxide.

2. An anaesthetic gas mixture as claimed in claim 1, having a content of 45 to 55% nitrous oxide, 3 to 7% of carbon dioxide and 40 to 50% of oxygen.

3. An anaesthetic gas mixture as claimed in claim 1 having a content of 50% nitrous oxide, 46% oxygen and 4% carbon dioxide.

4. An anaesthetic gas mixture as claimed in claim 1 and containing halothane in an effective amount below 1% in addition to the nitrous oxide and carbon dioxide.

* * * * *